(12) United States Patent
Mackenbach

(10) Patent No.: US 12,386,992 B2
(45) Date of Patent: Aug. 12, 2025

(54) MINIMIZING SENSITIVE DATA EXPOSURE LED BY UNAUTHORIZED EDGE SYSTEM DISPLACEMENT

(71) Applicant: Dell Products L.P., Round Rock, TX (US)

(72) Inventor: Jeroen Diederik Cornelis Antonius Mackenbach, Roosendaal (NL)

(73) Assignee: Dell Products L.P., Round Rock, TX (US)

( * ) Notice: Subject to any disclaimer, the term of this patent is extended or adjusted under 35 U.S.C. 154(b) by 201 days.

(21) Appl. No.: 18/352,294

(22) Filed: Jul. 14, 2023

(65) Prior Publication Data

US 2025/0021679 A1   Jan. 16, 2025

(51) Int. Cl.
  *G06F 21/62* (2013.01)
  *G06F 21/60* (2013.01)

(52) U.S. Cl.
  CPC ........ *G06F 21/6218* (2013.01); *G06F 21/602* (2013.01); *G06F 2221/2111* (2013.01)

(58) Field of Classification Search
  CPC ............... G06F 21/6218; G06F 21/602; G06F 2221/2111; G06F 2221/2143; G06F 21/88; G06F 21/62; H04L 63/107; H04L 67/10
  See application file for complete search history.

(56) References Cited

U.S. PATENT DOCUMENTS

| | | | |
|---|---|---|---|
| 9,838,877 B2 * | 12/2017 | Fitzgerald | H04W 12/12 |
| 2018/0241488 A1 * | 8/2018 | Daoura | H04W 4/70 |
| 2019/0371139 A1 * | 12/2019 | Engler | G06F 21/554 |
| 2022/0335807 A1 * | 10/2022 | De Jong | H04W 12/63 |

* cited by examiner

*Primary Examiner* — Abiy Getachew
(74) *Attorney, Agent, or Firm* — Chamberlain, Hrdlicka, White, Williams & Aughtry; Aly Z. Dossa (57) ABSTRACT

A method for safeguarding edge systems. The method includes: making a determination that an edge system is armed; based on the determination: detecting a geolocation difference between an edge system geolocation and a locked edge system geolocation; making a second determination that the geolocation difference falls outside a permitted threshold; and executing, based on the second determination, a breached-quarantine action on the edge system.

20 Claims, 5 Drawing Sheets

MINIMIZING SENSITIVE DATA EXPOSURE LED BY UNAUTHORIZED EDGE SYSTEM DISPLACEMENT

BACKGROUND

Edge systems, which tend to physically reside and operate outside the boundaries of on-premises infrastructure, are often prone, and thus exposed, to higher risks for attack, theft, and/or unauthorized access of sensitive data maintained on/by said edge systems.

SUMMARY

In general, in one aspect, embodiments described herein relate to a method for safeguarding edge systems. The method includes: making a determination that an edge system is armed; based on the determination: detecting a geolocation difference between an edge system geolocation and a locked edge system geolocation; making a second determination that the geolocation difference falls outside a permitted threshold; and executing, based on the second determination, a breached-quarantine action on the edge system.

In general, in one aspect, embodiments described herein relate to a non-transitory computer readable medium. The non-transitory computer readable medium includes computer readable program code, which when executed by a computer processor, enables the computer processor to perform a method for safeguarding edge systems. The method includes: making a determination that an edge system is armed; based on the determination: detecting a geolocation difference between an edge system geolocation and a locked edge system geolocation; making a second determination that the geolocation difference falls outside a permitted threshold; and executing, based on the second determination, a breached-quarantine action on the edge system.

In general, in one aspect, embodiments described herein relate to an edge system. The edge system includes: a computer processor at least configured to perform a method for safeguarding edge systems. The method includes: making a determination that the edge system is armed; based on the determination: detecting a geolocation difference between an edge system geolocation and a locked edge system geolocation; making a second determination that the geolocation difference falls outside a permitted threshold; and executing, based on the second determination, a breached-quarantine action on the edge system.

Other aspects of the invention will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of the embodiments by way of example and are not meant to limit the scope of the claims.

DETAILED DESCRIPTION

Specific embodiments will now be described with reference to the accompanying figures.

In the below description, numerous details are set forth as examples of embodiments described herein. It will be understood by those skilled in the art (who also have the benefit of this Detailed Description) that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection.

Thus, any path through which information may travel may be considered an operative connection.

In general, embodiments described herein relate to minimizing sensitive data exposure led by unauthorized edge system displacement. Edge systems, which tend to physically reside and operate outside the boundaries of on-premises infrastructure, are often prone, and thus exposed, to higher risks for attack, theft, and/or unauthorized access of sensitive data maintained on/by said edge systems. This is often the case because the locations at which said edge systems are typically deployed may be representative of unmanned and/or unguarded environments.

Embodiments described herein, accordingly, implement a solution for mitigating the above-mentioned risks, and thus directed to reducing the exposure of sensitive data upon the unauthorized movement/displacement of any edge system. Particularly, the solution proposes periodically tracking a geolocation (e.g., global positioning system (GPS) latitude and longitude coordinates) of an edge system and comparing said tracked geolocation to an established quarantine area (e.g., defined using a locked geolocation and a permitted threshold) within which movement/displacement of the edge system is authorized. Should said tracked geolocation fall outside the established quarantine area, the solution further proposes preventing any nefarious actor(s) from accessing any sensitive data stored on the edge system by triggering one or more quarantine-breaching action(s). Examples of said action(s) may include, but are not limited to: overwriting (e.g., zero-ing, randomizing, etc.), and thus effectively erasing, the entirety of the sensitive data; pertaining to self-encrypting edge system storage-modifying or deleting the encryption key, thereby rendering the entirety of the encrypted sensitive data indecipherable and thus unrecoverable; and sounding an audible alarm, thus bringing attention to the unauthorized movement/displacement of the edge system.

Figure 1A:
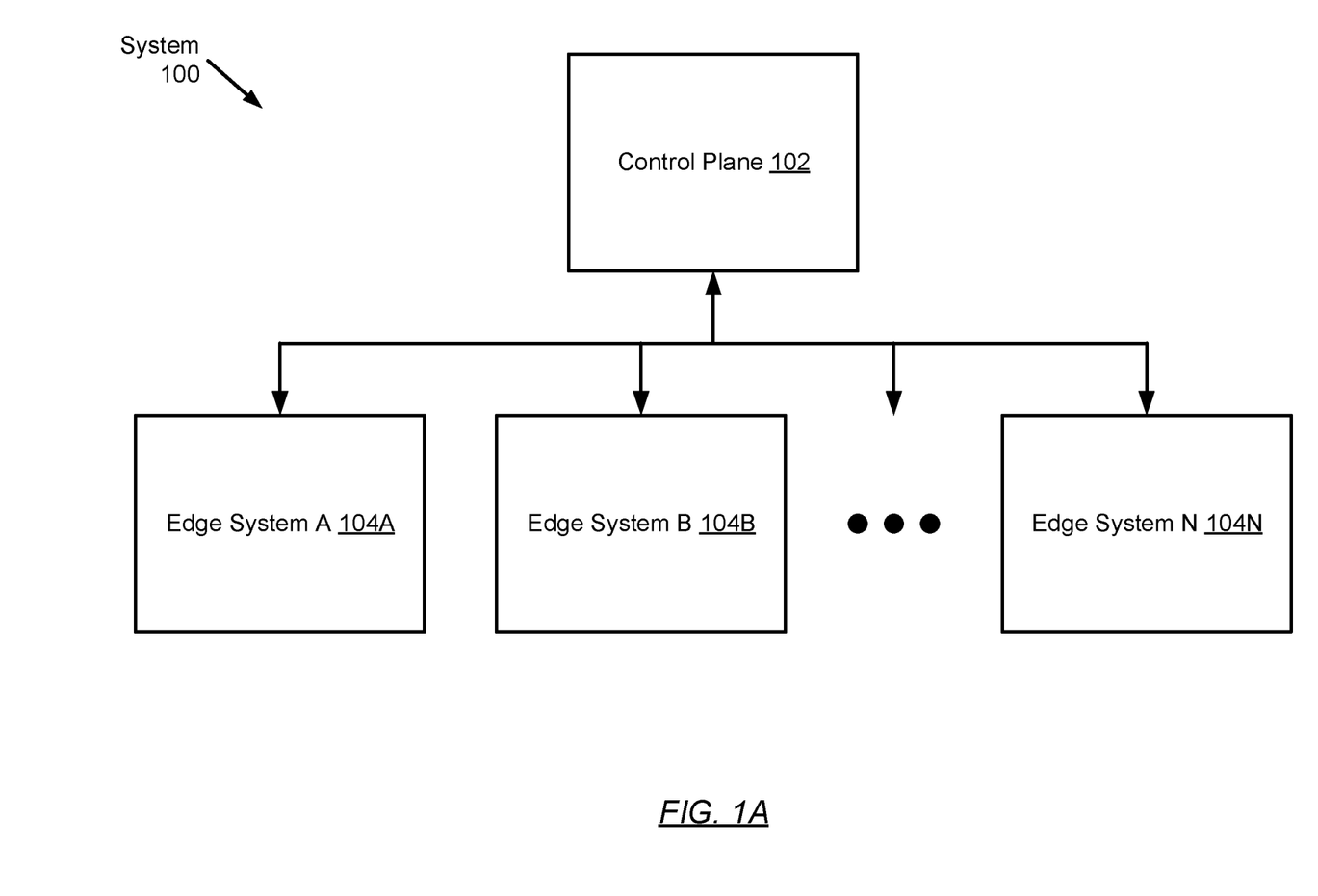
FIG. 1A shows a system in accordance with one or more embodiments described herein.

FIG. 1A shows a system in accordance with one or more embodiments described herein. The system (100) may include a control plane (102) and one or more edge system(s) (104A-104N). Each of these system (100) components is described below.

In one or many embodiment(s) described herein, the control plane (102) may represent any edge system management platform. To that extent, the control plane (102) may include functionality to: dynamically configure a permitted threshold for any given edge system (104A-104N), which refers to a maximum distance, from a locked edge system geolocation, that movement or displacement of the given edge system (104A-104N) may be allowed when the given edge system (104A-104N) is armed; dynamically configure a periodic check timer for any given edge system (104A-104N), which refers to a time device configured to measure a preset time interval, where the preset time interval may correspond to a periodicity at which a new current edge system geolocation, for the given edge system (104A-104N), may be obtained; arm any given edge system (104A-104N) through the submission of quarantine-arming commands thereto; and disarm any edge system (104A-104N) through the submission of quarantine-disarming commands thereto. One of ordinary skill, however, will appreciate that the control plane (102) may perform other functionalities without departing from the scope of the embodiments described herein.

In one or many embodiment(s) described herein, the control plane (102) may be implemented through enterprise information technology (IT) infrastructure (or at least a portion thereof). Said enterprise IT infrastructure (or at least a portion thereof) may include on-premises infrastructure, cloud computing infrastructure, or a hybrid infrastructure thereof. The control plane (102), accordingly, may be implemented using one or more network servers (not shown), where each network server may represent a physical or a virtual network server. Additionally, or alternatively, the control plane (102) may be implemented using one or more computing systems similar to the exemplary computing system illustrated and described with respect to FIG. 3, below.

In one or many embodiment(s) described herein, any edge system (104A-104N) may represent one or more physical devices collectively capable of receiving, generating, processing, storing, and/or transmitting data. The physical device(s) may be portable, mobile, or otherwise capable of being carried or moved. Any edge system (104A-104N) may include additional functionality to minimize sensitive data exposure led by any unauthorized displacement of the edge system-a method illustrated and described with respect to FIGS. 2A and 2B, below. One of ordinary skill, however, will appreciate that any edge system (104A-104N) may perform other functionalities without departing from the scope of the embodiments described herein. Examples of any edge system (104A-104N) may include, but are not limited to, a laptop computer, a tablet computer, a smartphone, an Internet of Things (IoT) device (e.g., smart electronic device or appliance), a network device (e.g., switch, router, gateway, access point, etc.), a wearable electronic device, a mobile data center (container), a Point of Sales (POS) terminal (e.g., mobile credit card reader, self-payment kiosk, payment terminal or register, etc.), and a Point of Care (PoC) terminal (e.g., patient healthcare information computer). Any edge system (104A-104N) is illustrated and described in further detail below with respect to FIG. 1B.

In one or many embodiment(s) described herein, the above-mentioned system (100) components (or subcomponents thereof) may communicate with one another through a network (not shown) (e.g., a local area network (LAN), a wide area network (WAN) such as the Internet, a mobile network, any other network type, or any combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components (or subcomponents thereof). Moreover, in communicating with one another, the above-mentioned system (100) components (or subcomponents thereof) may employ any combination of wired and/or wireless communication protocols.

While FIG. 1A shows a configuration of components and/or subcomponents, other system (100) configurations may be used without departing from the scope of the embodiments described herein.

Figure 1B:
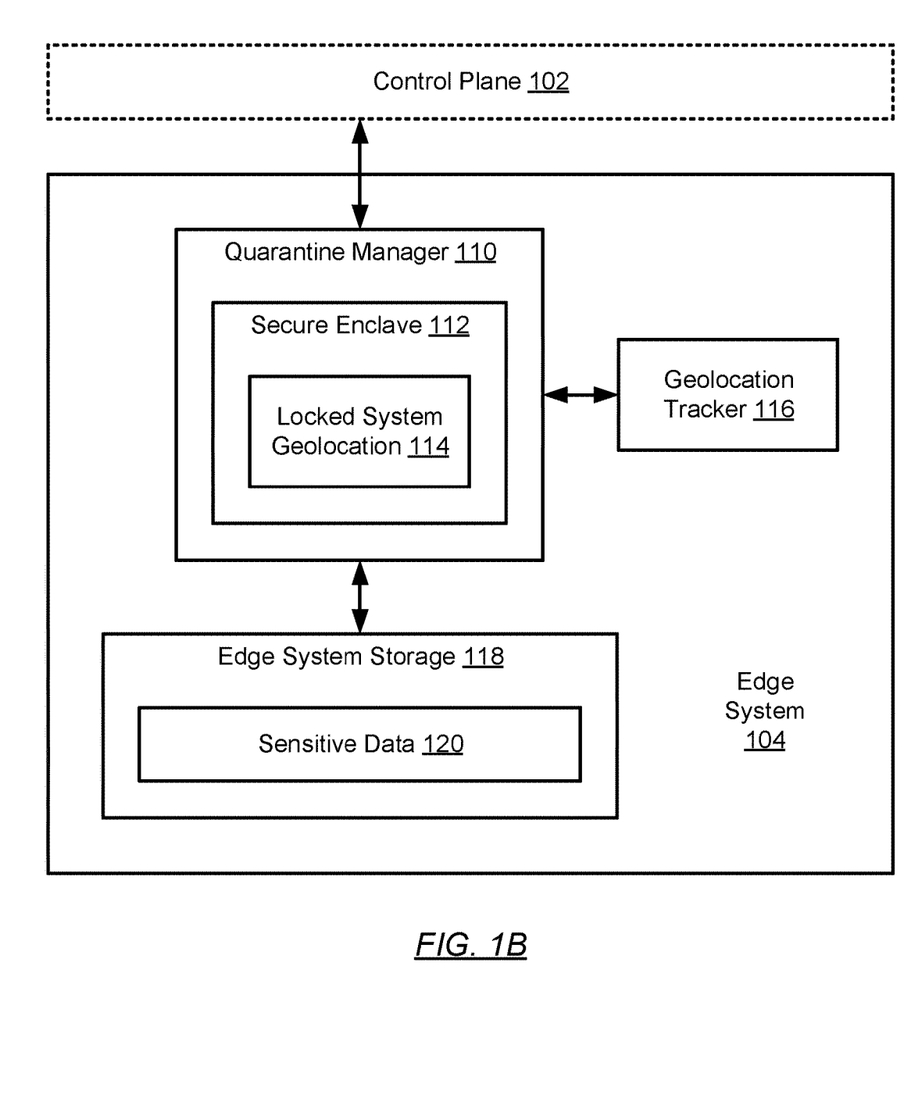
FIG. 1B shows an edge system in accordance with one or more embodiments described herein.

FIG. 1B shows an edge system in accordance with one or more embodiments described herein. The edge system (104) may include a quarantine manager (110), a geolocation tracker (116), and edge system storage (118). Each of these edge system (104) components is described below.

In one or many embodiment(s) described herein, the quarantine manager (110) may refer to instruction-processing hardware (e.g., any number of integrated circuits for processing computer readable instructions), a computer program executing on the underlying hardware of the edge system (104), or a combination thereof, at least configured to orchestrate the minimizing of sensitive data exposure led by unauthorized edge system (104) displacement. To that extent, the quarantine manager (110) may include functionality to perform the method illustrated and described with respect to FIGS. 2A and 2B, below. One of ordinary skill, however, will appreciate that the quarantine manager (110) may perform other functionalities without departing from the scope of the embodiments described herein.

In one or many embodiment(s) described herein, the quarantine manager (110) may include and manage a secure enclave (112). The secure enclave (112) may refer to a protected region of non-volatile memory only accessible to the quarantine manager (110). The secure enclave (112), accordingly, may appear as an inaccessible black box to any other components and/or processes of/on the edge system (104). Furthermore, the secure enclave (112) may be used, by the quarantine manager (110), to store a locked (edge) system geolocation (114). The locked (edge) system geolocation (114) may reference an intended or expected real-world geographic location (e.g., global positioning system (GPS) latitude and longitude coordinates) of the edge system (104) and where said edge system (104) had been deployed for service.

In one or many embodiment(s) described herein, the geolocation tracker (116) may refer to specialized hardware (e.g., a GPS receiver including, but not limited to, an omnidirectional antenna and a radio processor) at least configured to collect and convert signals from GPS satellites into measurements of position, velocity, and time. The position measurement (e.g., expressed in GPS latitude and longitude coordinates) for the edge system (104), which may be obtained at any given point-in-time, may also be referred herein as an (edge) system geolocation. The geolocation tracker (116) may include further functionality to: receive instructions or a request, from the quarantine manager (110), pertaining to ascertaining a current (edge) system geolocation; compute said current (edge) system geolocation using trilateration and signals broadcasted by GPS satellites; and provide said current (edge) system geolocation to the quarantine manager (110) in response to said received instructions/request. One of ordinary skill, however, will appreciate that the geolocation tracker (116) may perform other functionalities without departing from the scope of the embodiments described herein.

In one or many embodiment(s) described herein, the geolocation tracker (116) may additionally, or alternatively, encompass other specialized hardware (e.g., a wireless network adapter, interface, or radio) at least configured to ascertain the (edge) system geolocation via other means. Said other means may include, but is not limited to, translating a network address (e.g., an Internet Protocol (IP) address) of the edge system (104) into an approximate physical location thereof; and/or scanning for nearby Wi-Fi access points to compare against a known list of access points and their locations in order to triangulate an approximate physical location of the edge system (104).

In one or many embodiment(s) described herein, the edge system storage (118) may refer to, and thus may be implemented using, one or more physical storage devices (not shown). Each physical storage device may encompass non-transitory computer readable storage media on which various forms of data (including sensitive data (120) (described below))—respective to the purpose of the edge system (104)—may be stored in whole or in part, and temporarily or permanently. Examples of non-transitory computer readable storage media may include, but are not limited to, optical storage (e.g., compact discs (CDs) and digital versatile discs (DVDs)), magnetic storage (e.g., magnetic tapes, floppy disks, and hard disk drives (HDDs)), and solid state storage (e.g., solid state drives (SDDs), thumb drives, and secure digital (SD) cards).

In one or many embodiment(s) described herein, the edge system storage (118) may be self-encrypting. As self-encrypting storage, the edge system storage (118) may include functionality to encrypt data (e.g., sensitive data (120)) as said data is being written to the physical storage device(s) implementing the edge system storage (118), as well as decrypt any encrypted data being read from the physical storage device(s). Furthermore, as self-encrypting storage, the edge system storage (118) may maintain an encryption key therein, which may be used thereby to encrypt data and decrypt encrypted data. The encryption key may have been generated at a factory environment where the edge system storage (118) may have been manufactured. In one or many other embodiment(s) described herein, the edge system storage (118) may not be self-encrypting.

In one or many embodiment(s) described herein, the edge system storage (118) may store sensitive data (120). Sensitive data (120) may refer to private information, belonging to an individual, individuals, or an organization, that must/should be protected against unwarranted access and/or disclosure. Examples of sensitive data (120) may include, but are not limited to: patient protected health information (PHI) (e.g., demographic information, identity information, medical histories, test and laboratory results, health conditions, insurance information, etc.); customer payment information (e.g., credit and/or debit card(s) information, bank routing and account numbers, digital wallet credentials, etc.); employee information (e.g., social security number, birth date and/or place, phone number(s), residence address, passwords, gender, ethnicity, citizenship, etc.); user credential information (e.g., usernames, passwords, personal identification numbers (PINs), biometric data, etc.); and trade, proprietary, and government information (e.g., intellectual property, military secrets, business intelligence data, etc.).

While FIG. 1B shows a configuration of components and/or subcomponents, other edge system (104) configurations may be used without departing from the scope of the embodiments described herein.

Figure 2A:
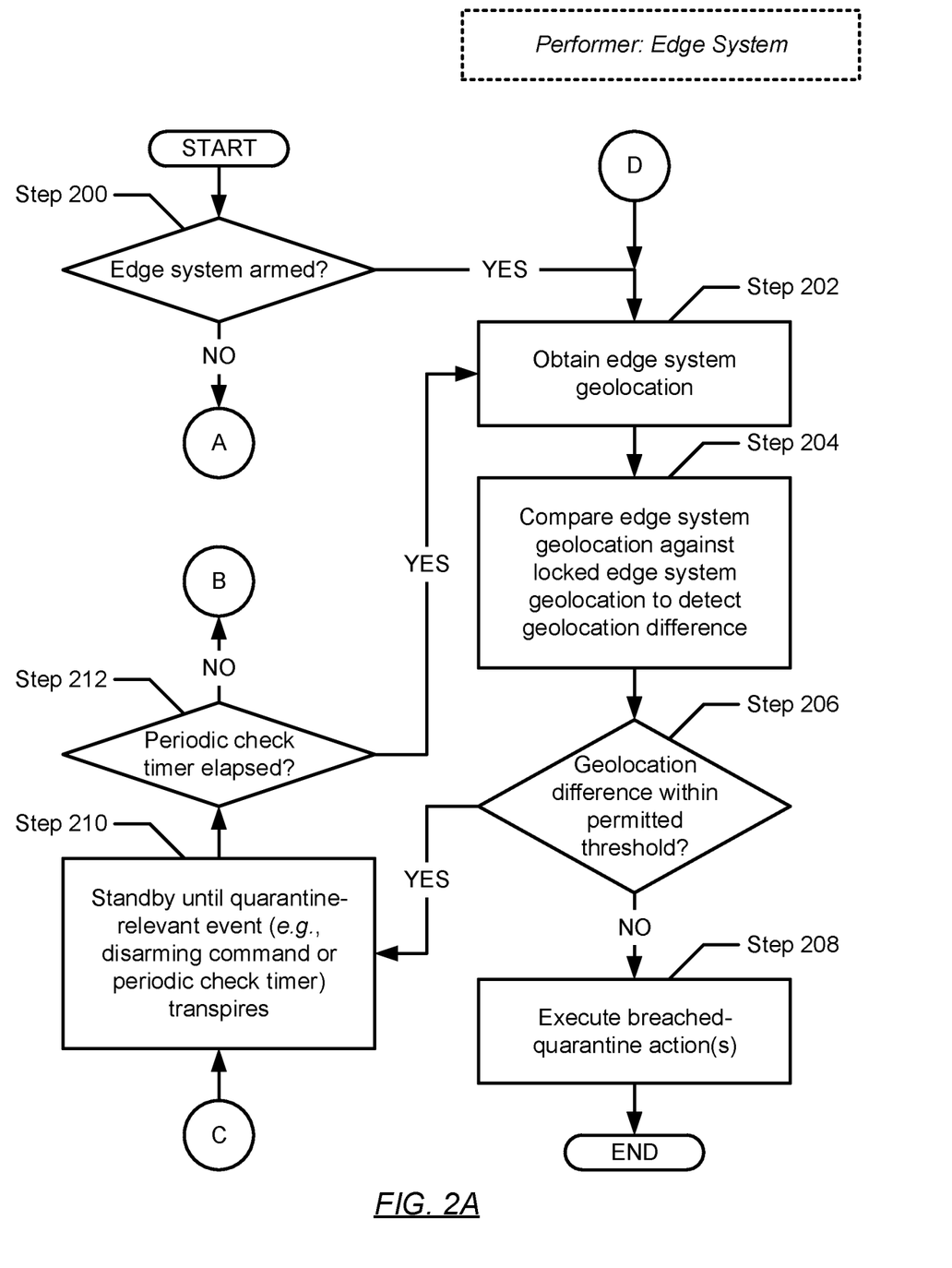
FIGS. 2A and 2B show a flowchart describing a method for minimizing sensitive data exposure led by unauthorized edge system displacement in accordance with one or more embodiments described herein.
Figure 2B:
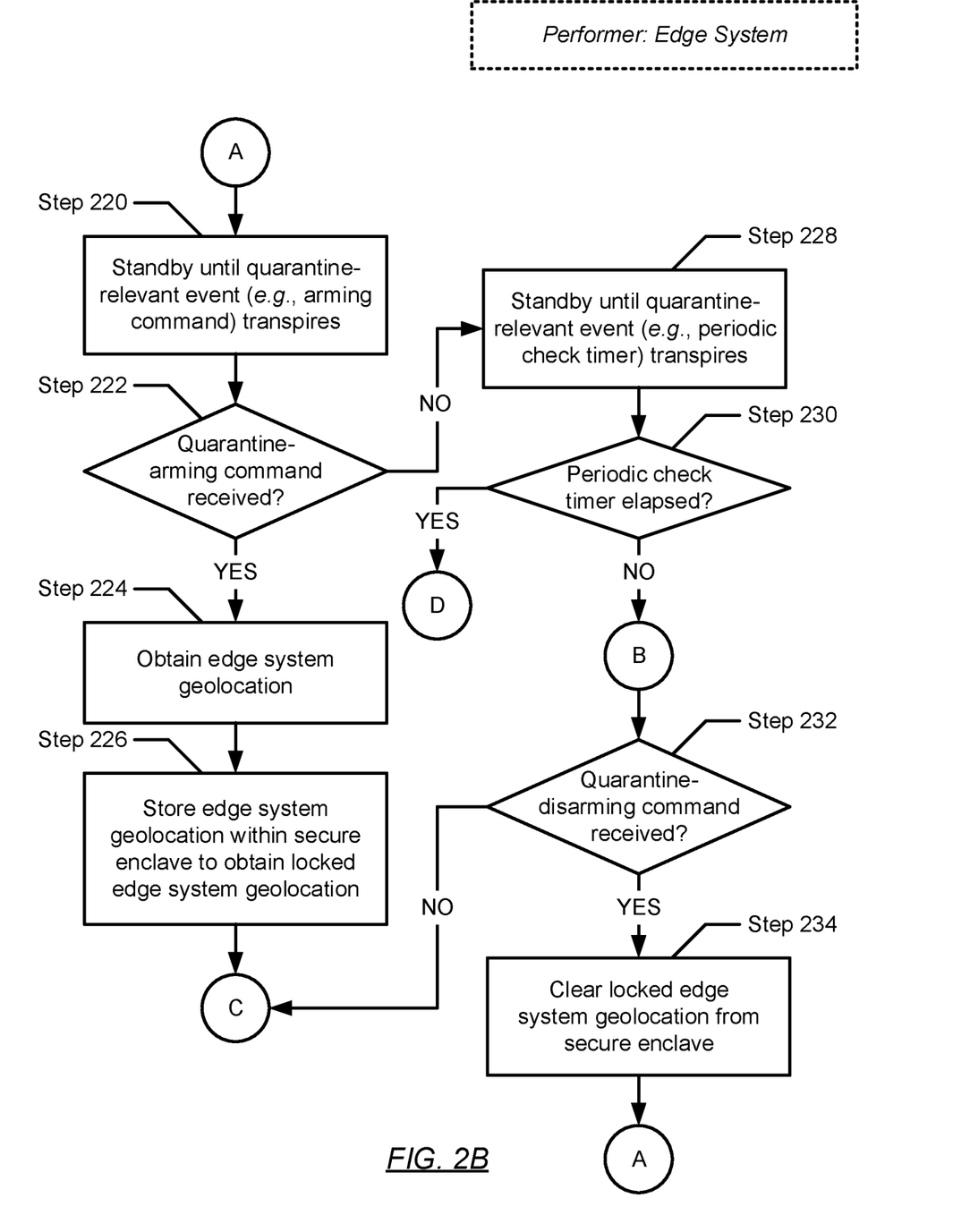

FIGS. 2A and 2B show a flowchart describing a method for minimizing sensitive data exposure led by unauthorized edge system displacement in accordance with one or more embodiments described herein. The various steps outlined below may be performed by any edge system (or more specifically, the quarantine manager thereof) (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

In one or many embodiment(s) described herein, the method described hereinafter may be initiated, and thus executed, during every boot (or initialization) routine experienced by the edge system following events (e.g., maintenance, upgrades, natural disasters, power outages, etc.) requiring a power cycle. The method, therefore, may reside in (or may be integrated into) a boot path of the edge system.

Turning to FIG. 2A, in Step 200, a determination is made as to whether the edge system is armed. In one or many embodiment(s) described herein, the determination may, for example, entail checking in-memory data (e.g., a bit flag) dedicated to storing an arming state (described below) of the edge system. As such, in one or many embodiment(s) described herein, if it is determined that the edge system is armed, then the method proceeds to Step 202. On the other hand, in one or many other embodiment(s) described herein, if it is alternatively determined that the edge system is unarmed, then the method alternatively proceeds to Step 220 (see e.g., FIG. 2B).

In one or many embodiment(s) described herein, the above-mentioned arming state of the edge system may reflect a quarantine status thereof restricting or permitting the movement (or displacement) thereof. The arming state, therefore, may be expressed through a binary (or two-state) value—e.g., a first state (i.e., an armed state) indicative that the movement/displacement of the edge system is restricted (e.g., following deployment to any intended deployment location); or a second state (i.e., an unarmed state) indicative that the movement/displacement of the edge system is permitted (e.g., prior to or between deployment(s) to any intended deployment location(s), during maintenance or re-configuration windows, etc.). Further, either of the quarantine statuses may be configured on, or applied to, the edge system by way of the control plane (see e.g., FIG. 1A) and, more specifically, via submission of quarantine-arming or quarantine disarming commands.

In Step 202, following the determination (made in Step 200) that the edge system is armed, an edge system geolocation is obtained. In one or many embodiment(s) described herein, the edge system geolocation may encompass a current real-world geographic location (e.g., global positioning system (GPS) latitude and longitude coordinates) of the edge system.

In Step 204, a geolocation difference is detected. In one or many embodiment(s) described herein, the geolocation difference may refer to a distance measurement computed between two sets of GPS latitude and longitude coordinates. Said two sets may include the edge system geolocation (obtained in Step 202) and a locked edge system geolocation. The latter may reference an intended or expected real-world geographic location (e.g., GPS latitude and longitude coordinates) (or the intended/expected deployment location) of the edge system, which may be stored in a secure enclave (see e.g., FIG. 1B). Further, the geolocation difference may be calculated using any existing algorithm for ascertaining the distance between two sets of GPS coordinates such as, for example, the haversine distance formula.

In one or many other embodiment(s) described herein, the geolocation difference may be alternatively computed between a pair of approximate physical locations (obtained through other means aside from GPS-see e.g., FIG. 1B), or between an approximate physical location (obtained through said other means) and a set of GPS latitude and longitude coordinates. Any of the approximate physical locations, obtained through said other means, may be obtained during a point-in-time when GPS is unavailable. On the other hand, GPS may be employed when the edge system is disconnected from any public or private networks.

In Step 206, a determination is made as to whether the geolocation difference (detected in Step 204) is within or inside a permitted threshold. The permitted threshold may refer to a maximum distance, from the locked edge system geolocation, that movement or displacement of the edge system may be allowed when the edge system is armed. The permitted threshold may be configured through the control plane (see e.g., FIG. 1A) and a distance value thereof may be contingent on various factors, including, but not limited to, the environment (e.g., area of a room, a building, a neighborhood, etc, wherein the edge system may be deployed) of the intended/expected deployment location, and any error(s) in geolocation difference calculation (e.g., due to the reliance of measurements pertaining to a perfect sphere, which the Earth is not, used in the haversine distance formula).

As such, in one or many embodiment(s) described herein, if it is determined that the geolocation difference falls outside the permitted threshold (i.e., the movement/displacement of the edge system is unauthorized), then the method proceeds to Step 208. On the other hand, in one or many other embodiment(s) described herein, if it is alternatively determined that the geolocation difference falls within/inside the permitted threshold (i.e., the movement/displacement of the edge system is authorized), then the method alternatively proceeds to Step 210.

In Step 208, following the determination (made in Step 206) that the geolocation difference (detected in Step 204) falls outside the permitted threshold, at least one breached-quarantine action is executed. In one or many embodiment(s) described herein, any breached-quarantine action, when executed, may work at least towards minimizing sensitive data (see e.g., FIG. 1B) exposure led by any unauthorized movement/displacement of the edge system. Examples of the at least one breached-quarantine action may include, but is/are not limited to: overwriting (e.g., zero-ing, randomizing, etc.), and thus effectively erasing, the entirety of the sensitive data; pertaining to self-encrypting edge system storage-modifying or deleting the encryption key, thereby rendering the entirety of the encrypted sensitive data indecipherable and thus unrecoverable; and sounding an audible alarm, thus bringing attention to the unauthorized movement/displacement of the edge system.

In one or many embodiment(s) described herein, aside from minimizing the risk of sensitive data exposure, any breached-quarantine action may further obstruct any future considerations, by nefarious actors having nefarious goals (e.g., sensitive data theft, edge system repurposing, etc.), towards stealing (or otherwise illegally obtaining) other deployed edge system(s).

In Step 210, following the alternate determination (made in Step 206) that the geolocation difference (detected in Step 204) falls within/inside the permitted threshold, the quarantine manager remains on standby until a quarantine-relevant event transpires. Examples of the quarantine-relevant event may include, but are not limited to: an elapsed periodic check timer; a received quarantine-disarming command; and a received quarantine-arming command.

In one or many embodiment(s) described herein, a periodic check timer may refer to a time device (e.g., a hardware- and/or software-implemented clock) configured to measure a preset time interval, where the preset time interval may correspond to a periodicity at which a new current edge system geolocation, for the edge system, may be obtained. The preset time interval, further, may be dynamically configured by way of the control plane (see e.g., FIG. 1A). Accordingly, any quarantine-relevant event, in the form of an elapsed periodic check timer, may reference the completion of the preset time interval.

In one or many embodiment(s) described herein, a quarantine-disarming command may refer to computer readable program instructions directed to disarming the edge system. Disarmament of the edge system may entail setting a quarantine status thereof to a state (i.e., an unarmed state) indicative that the movement/displacement of the edge system is permitted (e.g., prior to or between deployment(s) to any intended deployment location(s), during maintenance or re-configuration windows, etc.). Further, the quarantine-disarming command may be submitted to the edge system by/from the control plane (see e.g., FIG. 1A). Accordingly, any quarantine-relevant event, in the form of a received quarantine-disarming command, may reference the receipt of instructions that authorize the movement/displacement of the edge system.

In one or many embodiment(s) described herein, a quarantine-arming command may refer to computer readable program instructions directed to arming the edge system. Armament of the edge system may entail setting a quarantine status thereof to a state (i.e., an armed state) indicative that the movement/displacement of the edge system is restricted (e.g., following deployment to any intended deployment location). Further, the quarantine-arming command may be submitted to the edge system by/from the control plane (see e.g., FIG. 1A). Accordingly, any quarantine-relevant event, in the form of a received quarantine-arming command, may reference the receipt of instructions that do not authorize the movement/displacement of the edge system.

In Step 212, a determination is made as to whether a quarantine-relevant event, in the form of an elapsed periodic check timer (described above-see e.g., Step 210), has transpired. In one or many embodiment(s) described herein, if it is determined that a quarantine-relevant event (in the form of an elapsed periodic check timer) has transpired, then the method proceeds to Step 232 (see e.g., FIG. 2B). On the other hand, in one or many other embodiment(s) described herein, if it is alternatively determined that no quarantine-relevant event has transpired or a quarantine-relevant event (in a form other than of an elapsed periodic check timer) has transpired, then the method alternatively proceeds to Step 202 (described above), where another edge system geolocation may be obtained.

Turning to FIG. 2B, in Step 220, following the alternate determination (made in Step 200) that the edge system is unarmed, the quarantine manager remains on standby until a quarantine-relevant event (described above-see e.g., Step 210) transpires.

In Step 222, a determination is made as to whether a quarantine-relevant event, in the form of a received quarantine-arming command (described above-see e.g., Step 210), has transpired. In one or many embodiment(s) described herein, if it is determined that a quarantine-relevant event (in the form of a received quarantine-arming command) has transpired, then the method proceeds to Step 224. On the other hand, in one or many other embodiment(s) described herein, if it is alternatively determined that no quarantine-relevant event has transpired or a quarantine-relevant event (in a form other than of an elapsed periodic check timer) has transpired, then the method alternatively proceeds to Step 228.

In Step 224, following the determination (made in Step 222) that a quarantine-relevant event (in the form of a received quarantine-arming command) has transpired, an edge system geolocation is obtained. In one or many embodiment(s) described herein, the edge system geolocation may encompass a current real-world geographic location (e.g., global positioning system (GPS) latitude and longitude coordinates) of the edge system.

In Step 226, the edge system geolocation (obtained in Step 224) is stored within a secure enclave (see e.g., FIG. 1B). In one or many embodiment(s) described herein, the secure enclave may refer to a protected region of non-volatile memory only accessible to the quarantine manager.

Hereinafter, the method proceeds to Step 210 (described above), where the quarantine manager remains on standby until a quarantine-relevant event (described above—see e.g., Step 210) transpires.

In Step 228, following the alternate determination (made in Step 222) that no quarantine-relevant event has transpired or a quarantine-relevant event (in a form other than a received quarantine-arming command) has transpired, the quarantine manager remains on standby until a quarantine-relevant event (described above-see e.g., Step 210) transpires.

In Step 230, a determination is made as to whether a quarantine-relevant event, in the form of an elapsed periodic check timer (described above-see e.g., Step 210), has transpired. In one or many embodiment(s) described herein, if it is determined that a quarantine-relevant event (in the form of an elapsed periodic check timer) has transpired, then the method proceeds to Step 202 (described above), where another edge system geolocation may be obtained. On the other hand, in one or many other embodiment(s) described herein, if it is alternatively determined that no quarantine-relevant event has transpired or a quarantine-relevant event (in a form other than of an elapsed periodic check timer) has transpired, then the method alternatively proceeds to Step 232.

In Step 232, following the determination (made in Step 230) that a quarantine-relevant event (in the form of an elapsed periodic check timer) has transpired, or following the alternate determination (made in Step 212) that no quarantine-relevant event has transpired or a quarantine-relevant event (in a form other than an elapsed periodic check timer) has transpired, a determination is made as to whether a quarantine-relevant event (in the form of a received quarantine-disarming command) (described above-see e.g., Step 210) has transpired. In one or many embodiment(s) described herein, if it is determined that a quarantine-relevant event (in the form of a received quarantine-disarming command) has transpired, then the method proceeds to Step 234. On the other hand, in one or many other embodiment(s) described herein, if it is alternatively determined that no quarantine-relevant event has transpired or a quarantine-relevant event (in a form other than a received quarantine-disarming command) has transpired, then the method alternatively proceeds to Step 210 (described above), where the quarantine manager remains on standby until a quarantine-relevant event transpires.

In Step 234, following the determination (made in Step 232) that a quarantine-relevant event (in the form of a received quarantine-disarming command) has transpired, the locked (edge) system geolocation, stored in the secure enclave (see e.g., FIG. 1B), is cleared therefrom.

Hereinafter, the method proceeds to Step 220 (described above), where the quarantine manager remains on standby until a quarantine-relevant event (described above-see e.g., Step 210) transpires.

Figure 3:
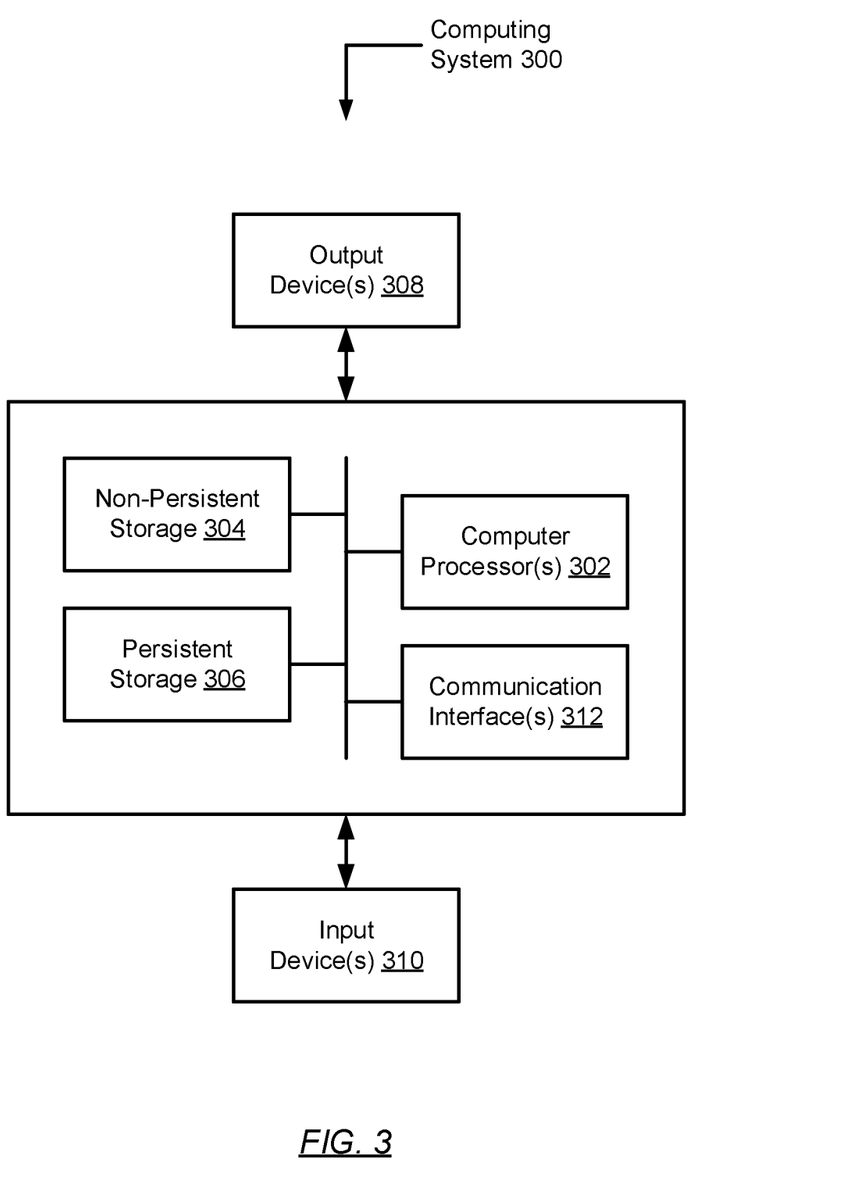
FIG. 3 shows a computing system in accordance with one or more embodiments described herein.

FIG. 3 shows a computing system in accordance with one or more embodiments described herein. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one or many embodiment(s) described herein, the computer processor(s) (302) may be an integrated circuit for processing instructions. For example, the computer processor(s) may be one or more cores or micro-cores of a central processing unit (CPU) and/or a graphics processing unit (GPU). The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one or many embodiment(s) described herein, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments described herein.

While the technology has been described with respect to a limited number of embodiments, those skilled in the art, having benefit of this disclosure, will appreciate that other embodiments can be devised which do not depart from the scope of the embodiments described herein. Accordingly, the scope of the embodiments described herein should be limited only by the attached claims.

What is claimed is:

1. A method for safeguarding edge systems, the method comprising:
    making a determination that an edge system is armed, wherein the edge system is in an arming state associated with a quarantine status, wherein the quarantine status indicates that a movement of the edge system is restricted;
    based on the determination:
        detecting a geolocation difference between an edge system geolocation and a locked edge system geolocation, wherein the geolocation difference is calculated by using a set of algorithms, wherein the set of algorithms comprises a Haversine distance formula;
        making a second determination that the geolocation difference falls outside a permitted threshold; and
        executing, based on the second determination, a breached-quarantine action on the edge system.

2. The method of claim 1, wherein the breached-quarantine action on the edge system comprises erasing sensitive data stored on the edge system.

3. The method of claim 1, wherein the breached-quarantine action on the edge system comprises erasing an encryption key for deciphering encrypted sensitive data stored on the edge system.

4. The method of claim 1, wherein the edge system geolocation represents a current geographical position of the edge system.

5. The method of claim 1, wherein the locked edge system geolocation represents an intended geographical position of and where the edge system had been deployed.

6. The method of claim 1, the method further comprising:
    prior to making the determination that the edge system is armed:
        making a second determination that the edge system is unarmed;
        based on the second determination:
            waiting until a quarantine-arming command is received;
            obtaining a second edge system geolocation upon receiving the quarantine-arming command; and
            storing the second edge system geolocation within a secure enclave to obtain the locked edge system geolocation.

7. The method of claim 1, the method further comprising:
    prior to detecting the geolocation difference between the edge system geolocation and the locked edge system geolocation:
        detecting a second geolocation difference between a second edge system geolocation and the locked edge system geolocation;
        making a third determination that the second geolocation difference falls within the permitted threshold;
        based on the third determination:
            waiting until a periodic check timer has elapsed; and
            obtaining the edge system geolocation upon the periodic check timer elapsing.

8. A non-transitory computer readable medium comprising computer readable program code, which when executed by a computer processor, enables the computer processor to perform a method for safeguarding edge systems, the method comprising:
    making a determination that an edge system is armed, wherein the edge system is in an arming state associated with a quarantine status, wherein the quarantine status indicates that a movement of the edge system is restricted;
    based on the determination:
        detecting a geolocation difference between an edge system geolocation and a locked edge system geolocation, wherein the geolocation difference is calculated by using a set of algorithms, wherein the set of algorithms comprises a Haversine distance formula;
        making a second determination that the geolocation difference falls outside a permitted threshold; and
        executing, based on the second determination, a breached-quarantine action on the edge system.

9. The non-transitory computer readable medium of claim 8, wherein the breached-quarantine action on the edge system comprises erasing sensitive data stored on the edge system.

10. The non-transitory computer readable medium of claim 8, wherein the breached-quarantine action on the edge system comprises erasing an encryption key for deciphering encrypted sensitive data stored on the edge system.

11. The non-transitory computer readable medium of claim 8, wherein the edge system geolocation represents a current geographical position of the edge system.

12. The non-transitory computer readable medium of claim 8, wherein the locked edge system geolocation represents an intended geographical position of and where the edge system had been deployed.

13. The non-transitory computer readable medium of claim 8, the method further comprising:
  prior to making the determination that the edge system is armed:
    making a second determination that the edge system is unarmed;
    based on the second determination:
      waiting until a quarantine-arming command is received;
      obtaining a second edge system geolocation upon receiving the quarantine-arming command; and
      storing the second edge system geolocation within a secure enclave to obtain the locked edge system geolocation.

14. The non-transitory computer readable medium of claim 8, the method further comprising:
  prior to detecting the geolocation difference between the edge system geolocation and the locked edge system geolocation:
    detecting a second geolocation difference between a second edge system geolocation and the locked edge system geolocation;
    making a third determination that the second geolocation difference falls within the permitted threshold;
    based on the third determination:
      waiting until a periodic check timer has elapsed; and
      obtaining the edge system geolocation upon the periodic check timer elapsing.

15. An edge system, the edge system comprising:
  a computer processor at least configured to perform a method for safeguarding edge systems, the method comprising:
    making a determination that the edge system is armed, wherein the edge system is in an arming state associated with a quarantine status, wherein the quarantine status indicates that a movement of the edge system is restricted;
    based on the determination:
      detecting a geolocation difference between an edge system geolocation and a locked edge system geolocation, wherein the geolocation difference is calculated by using a set of algorithms, wherein the set of algorithms comprises a Haversine distance formula;
      making a second determination that the geolocation difference falls outside a permitted threshold; and
      executing, based on the second determination, a breached-quarantine action on the edge system.

16. The edge system of claim 15, the edge system further comprising:
  non-volatile memory operatively connected to the computer processor; and
  a secure enclave defined by a protected region of the non-volatile memory and configured to store the locked edge system geolocation.

17. The edge system of claim 15, the edge system further comprising:
  storage operatively connected to the computer processor and configured to at least store sensitive data.

18. The edge system of claim 17, wherein the breached-quarantine action on the edge system comprises erasing the sensitive data.

19. The edge system of claim 17, wherein the storage is self-encrypting and further configured to store encrypted sensitive data.

20. The edge system of claim 19, wherein the breached-quarantine action on the edge system comprises erasing an encryption key for deciphering the encrypted sensitive data.

* * * * *